United States Patent [19]
Doran et al.

[11] Patent Number: 5,928,377
[45] Date of Patent: Jul. 27, 1999

[54] METHOD AND APPARATUS FOR DATA TRANSMISSION THROUGH MANIPULATION OF ENCODING FORMATS

[75] Inventors: Patrick J. Doran, Plantation; Chin Pan Wong, Fort Lauderdale, both of Fla.

[73] Assignee: Motorola, Inc., Schaumburg, Ill.

[21] Appl. No.: 08/735,446

[22] Filed: Oct. 4, 1996

[51] Int. Cl.⁶ .............................. G06F 11/10; H03M 13/12
[52] U.S. Cl. .......................... 714/786; 714/795; 375/262; 375/265; 375/341
[58] Field of Search .......................... 371/43.1, 36, 43.6, 371/43.7, 43.3, 43.4, 43.5, 43.8; 375/341, 261, 262, 263, 264, 265, 340

[56] References Cited

U.S. PATENT DOCUMENTS 5,077,741  12/1991  Kotzin ........................................ 371/30
5,414,526   5/1995  Friedman ................................. 358/426

*Primary Examiner*—Emmanuel L. Moise
*Attorney, Agent, or Firm*—Andrew S. Fuller

[57] ABSTRACT

An encoder provides enhanced data encoding by manipulating encoding formats for standard data to effect transfer of additional data (300). Data recovery of the additional data is provided through a corresponding detection of decoding formats for decoding the standard data (400).

18 Claims, 5 Drawing Sheets

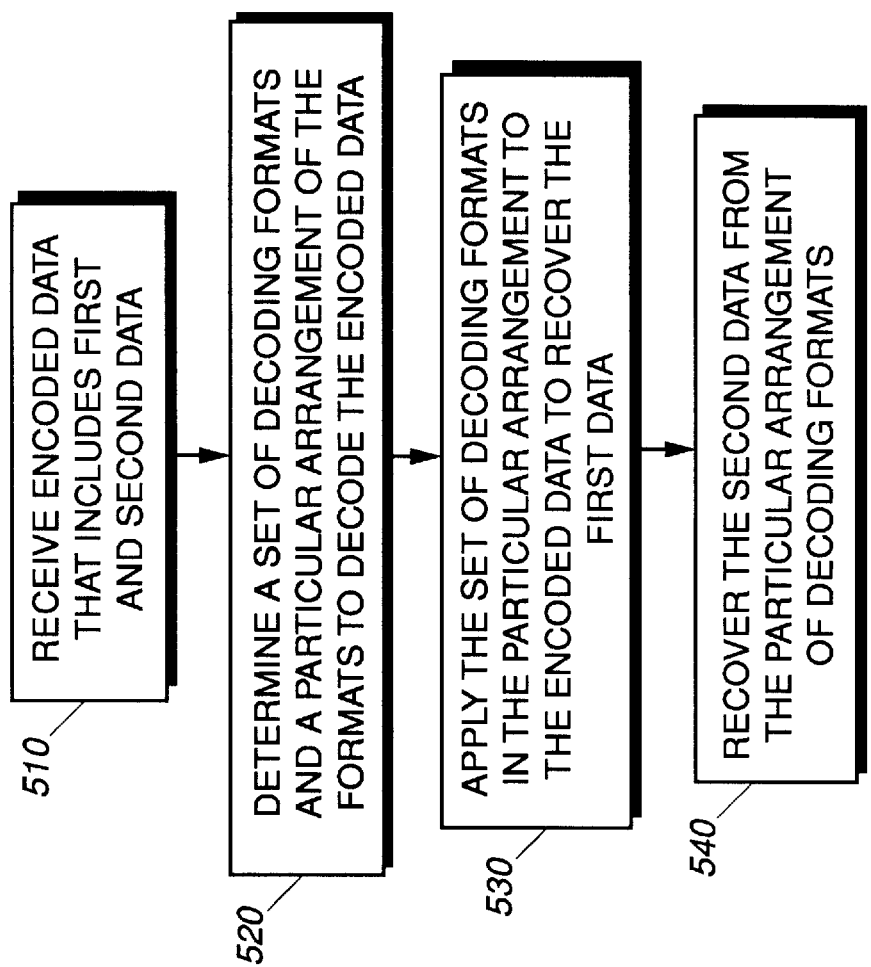

5,928,377

METHOD AND APPARATUS FOR DATA TRANSMISSION THROUGH MANIPULATION OF ENCODING FORMATS

TECHNICAL FIELD

This invention relates in general to radio communication systems, and more particularly, to digital information encoding and decoding.

BACKGROUND

In a typical digital radio communication system, information throughput tends to be limited by channel bandwidth, and channel modulation and information encoding techniques. Channel modulation and bandwidth are ordinarily fixed for a particular communication channel, and are determined based on external constraints imposed on the system, or overall system design. Digital information is frequently encoded to support error mitigation. Accordingly, encoding requirements may vary depending on the type of data being transmitted. For example, a given desired error mitigation level may require a particular data encoding rate. The encoding rate and encoding technique used affect the overall information throughput.

One commonly used encoding technique is that of convolutional encoding. FIG. 1 is a flowchart of procedures 100 summarizing the encoding process. Here, data symbols are obtained for transmission, step 110, and mapped to output data symbols using a finite encoder state machine that implements a specific encoding format, step 120. The output symbols are then modulated on a carrier signal, step 130, and the modulated signal transmitted on a communication channel, step 140.

At a receiving end, a Viterbi algorithm, or a derivation thereof, is a popular way of decoding convolutionally encoded information. The Viterbi algorithm is an efficient way of determining the likelihood that a particular received symbol represents a transmitted symbol that may have been influenced by noise in the transmission channel. The Viterbi algorithm uses the fact that a convolutional encoder is a state machine in which each input symbol causes a state transition and an associated output symbol. Thus, in a prior art applications, the Viterbi algorithm depends on prior knowledge as to encoding state machine, i.e., there is prior knowledge of a specific decoding format.

Channel bandwidth, modulation technique, and error mitigation requirements impose constraints on the rate of transfer of digital symbols on a particular communication channel. However, it is desirable to increase throughput within these constraints. Therefore, a new digital communication technique is needed.

BRIEF DESCRIPTION OF THE DRAWINGS

FIG. 5 is a flowchart of procedures for decoding first and second data by selective use of decoding formats, in accordance with the present invention.

DETAILED DESCRIPTION OF THE PREFERRED EMBODIMENT

The present invention provides for enhanced data encoding by manipulating encoding formats for standard data to effect transfer of additional data. Data recovery of the additional data is provided through a corresponding detection of decoding formats for decoding the standard data. In an example of operation, a sequence of encoding formats is selected to encode the standard data, which sequence of encoding formats represents an encoding of the additional data. Each encoding format is applied to a portion of the standard data to generate encoded data which is transmitted. At a receiver, the data is recovered by determining the set of decoding formats that properly decodes the encoded data. Each decoding format of the set is applied to a portion of the encoded data to recover the standard data, and the additional data recovered from the particular arrangement of the decoding formats applied.

Figure 1:
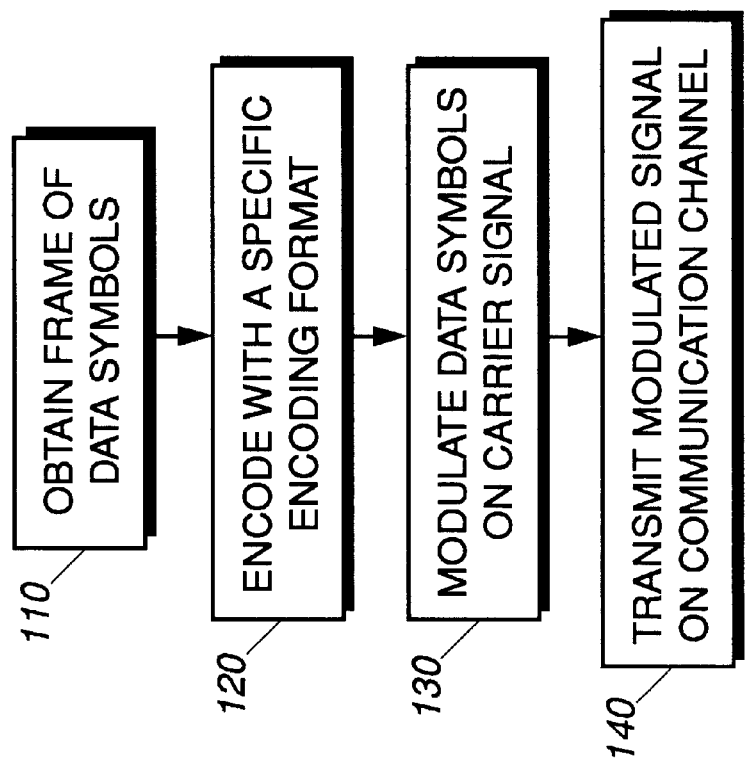
FIG. 1 is a flowchart of procedures summarizing a prior art encoding process.
Figure 2:
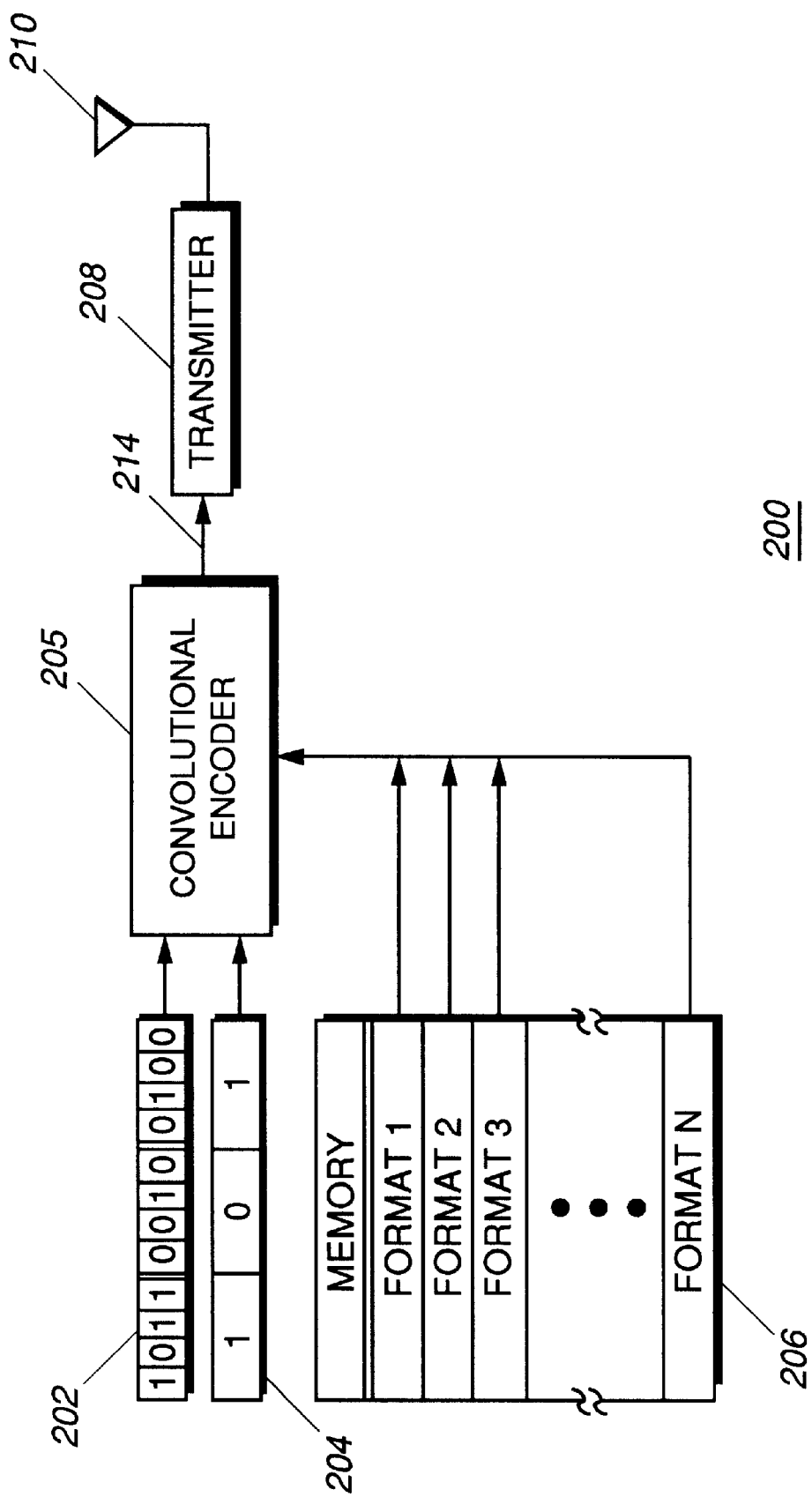
FIG. 2 is a block diagram of a portion of a radio communication device having an encoder, in accordance with the present invention.

FIG. 2 is a block diagram of a portion of a communication device 200 that encodes information in accordance with the present invention. The communication device is a two-way portable radio having circuitry for communicating over a radio frequency channel. In the preferred embodiment, the radio 200 operates by using 16-QAM (quadrature amplitude modulation) to transmit digital information. Within the radio 200, standard data 202, and additional data 204 form input data which is coupled to a convolutional encoder 205. The convolutional encoder 205 is coupled to a memory 206 that stores multiple encoding formats. The convolutional encoder is adaptable to generate encoded data 214 from the input data 202,204. The encoded data 214 is coupled to a transmitter 208, which in turn is coupled to an antenna 210.

In operation, the radio 200 encodes digital information for transmission using convolutional encoding. This encoding process ordinarily uses a finite encoder state machine, which may be represented by a trellis, to map data symbols, such as bits, to encoded symbols according to a particular encoding format. In defining an encoding format, consider a trellis for a frame of P input bits. The trellis will have P stages, since each stage corresponds to one input bit being shifted into the encoder state machine. At each stage of the trellis, there is a specific input bit to output symbol mapping, which can be different for each stage of the trellis. The specific mappings for each of the P stages of the trellis, taken as a whole, is an example of an encoding.

According to the present invention, the encoder 205 encodes the standard data 202 by application of at least some of the encoding formats in memory 206 in a particular arrangement, which particular arrangement of encoding formats encodes the additional data 204. In the preferred embodiment, each encoding format represents an alternative mapping developed by swapping output symbols out of each of the states of the trellis to create signal constellations that are far apart from each other. When multiple coding rates are used, an alternative embodiment creates multiple encoding formats by reordering of the stages of the trellis. However formed, the use of multiple encoding formats results in different sets of output symbols for the same set of input symbols. Subject to channel conditions, this difference can be reliably detected by a decoder having no prior knowledge of the order of encoding formats used. For example, as the number of alternative encoding formats is increased by a factor of two (2), the amount of additional information sent per frame can be increased by one bit. Practical considerations to channel degradation may limit the decoder from distinguishing between formats which limit the additional bits that can be transmitted. Moreover, the additional processing power required to properly decode encoded symbols provides practical limitations.

Figure 3:
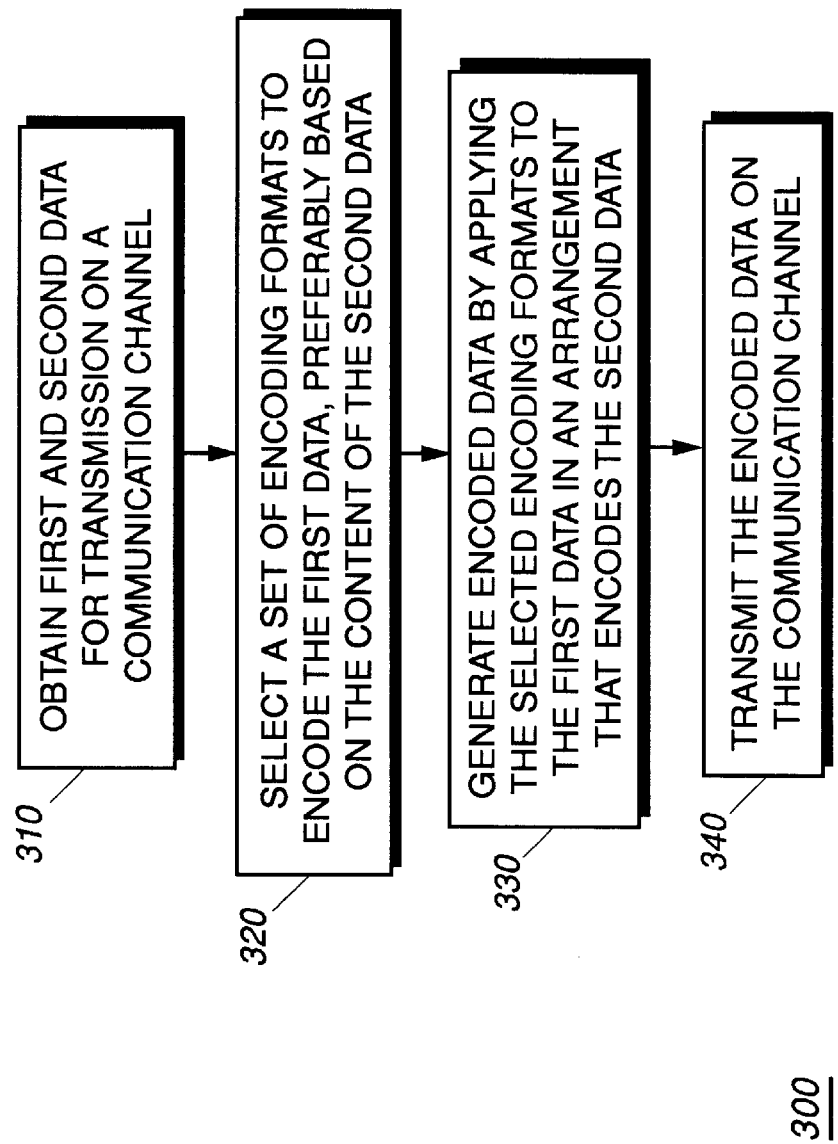
FIG. 3 is a flowchart of procedures for generating encoded data from first and second data by selective use of encoding formats, in accordance with the present invention.

FIG. 3 is a flowchart of procedures 300 summarizing the data transmission operation, in accordance with the present invention. At a transmitter or transceiver, first and second data are obtained for transmission on a communication channel, step 310. The first data is information to be transmitted, and preferably represents one or more frames of data symbols. The second data is additional data, which may for example, supplement the first data. The contents of the second data is used to select a sequence or set of encoding formats for application to the first data, step 320. Encoded data is generated by applying the selected sequence of encoding formats to various portions of the first data in an arrangement that encodes the second data, step 330. In the preferred embodiment, the encoded data is generated by convolutionally encoding the first data by transitioning through a multi-stage trellis of a convolutional encoder or state machine while mapping information symbols to channel symbols according to one of the plurality of encoding formats. At various stages of the multi-stage trellis, encoding formats are selected, according to the content of the second data, such that the sequence encoding formats used represents an encoding of the second data. The encoded data is then modulated on a carrier signal and transmitted on the communication channel, step 340.

Figure 4:
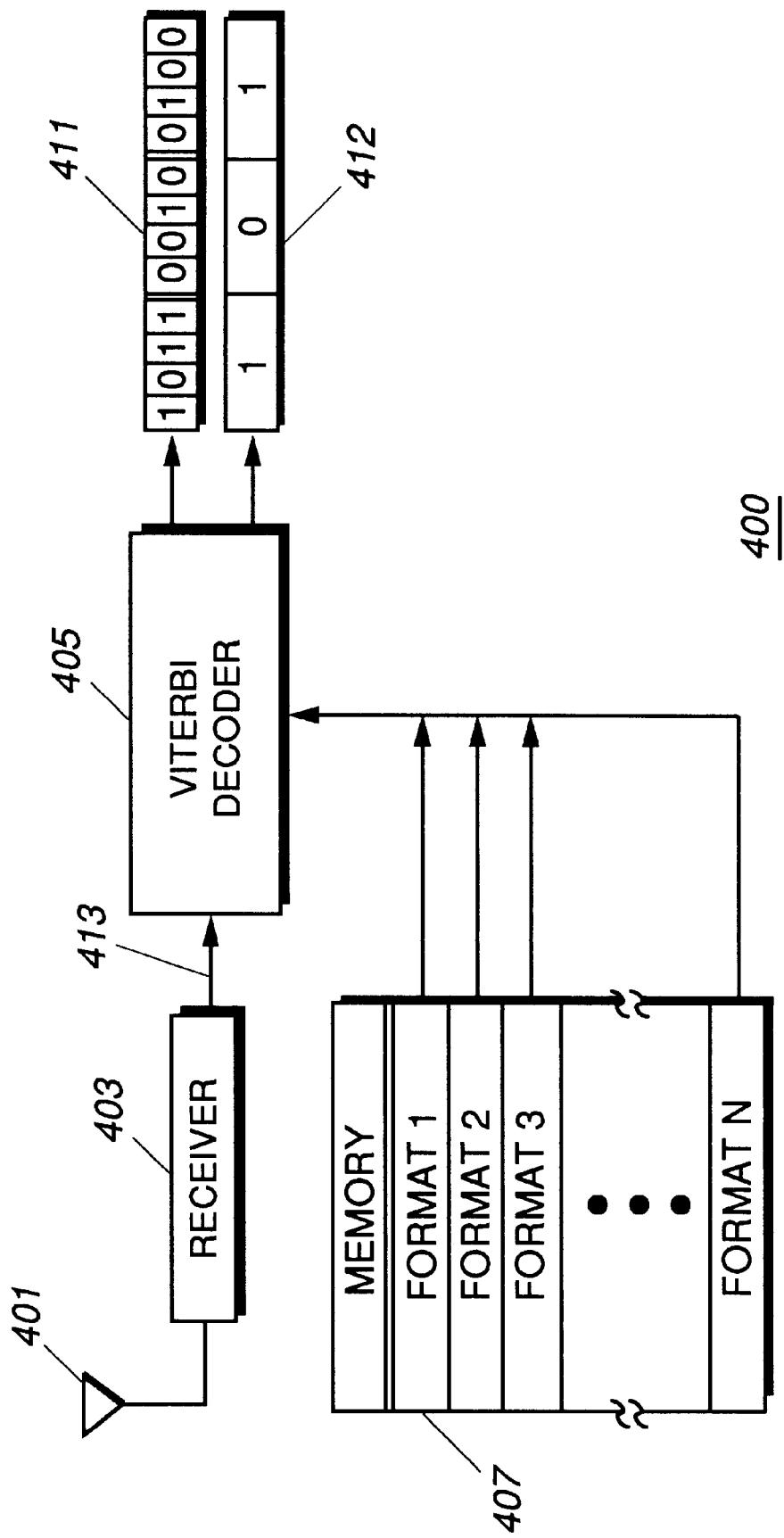
FIG. 4 is a block diagram of a portion of a radio communication device having a decoder, in accordance with the present invention.

FIG. 4 is a block diagram of a portion of a communication device 400 that decodes information, in accordance with the present invention. As in FIG. 2, the communication device is a two-way portable radio having circuitry for communicating over a radio frequency channel using 16-QAM signaling. The radio 400 includes an antenna 401, a receiver 403, a Viterbi decoder 405, and a memory 407. The receiver 403 is coupled to the antenna 401 and is adaptable to receive encoded data from a communication channel, and to generate demodulated encoded data 413. The memory 407 stores a set of decoding formats corresponding to the set of encoding formats used to create the encoded data 413. The decoder 405 is coupled to the receiver 403 and to the memory 407, and is adaptable to select a particular arrangement of decoding formats that decode the encoded data 413, to generate standard data 411 and additional data 412. The decoder 405 uses a Viterbi Algorithm to determine the likelihood that a particular received symbol represents a transmitted symbol. The decoding process may be represented by a trellis diagram that is used to determine the most likely series of state transitions at the encoder. For each received symbol, a branch metric is computed which represents the distance between the received symbol and each of the possible transmitted symbols. The Viterbi Algorithm uses a traceback process to determine an ideal path through the trellis, i.e., the shortest path through the trellis, where distance is represented by the cumulative branch metrics. According to the invention, this process is repeated for each decoding format, and the decoding format yielding branch metrics wit the shortest resultant path is selected to decode a particular symbol or set of symbols. In this manner, multiple decoding formats are applied in a particular arrangement to decode the encoded data. Accordingly, the decoder 405 is responsive to the encoded data to recover the standard data by applying the decoding formats to the encoded data, according to a particular arrangement, and to recover additional data from the particular arrangement of the decoding formats.

FIG. 5 is a flowchart of procedures 500 summarizing the decoding operation, in accordance with the present invention. At a receiver, encoded data is received that includes first and second data in an encoded format, step 510. The first data preferably represents one or more frames of data symbols. The second data is additional data, which may for example, supplement the first data. A decoding process then operates to determine a set of decoding formats and a particular arrangement of the formats to decode the encoded data, step 520. The set of decoding formats is applied in the particular arrangement to the encoded data to recover the first data, step 530. The second data is recovered from the particular arrangement of the decoding formats as applied, step 540.

The present invention provides significant benefits over the prior art. Increased information throughput can be obtained while abiding by channel bandwidth, and modulation technique constraints, while managing any impact on error mitigation requirements. This technique is particularly useful in extending data throughput capacity in existing radio communication systems.

What is claimed is:

1. A method, comprising the steps of:
   obtaining first and second data;
   selecting a sequence of encoding formats to encode the first data, which sequence of encoding formats represents an encoding of the second data; and
   applying each encoding format of the sequence of encoding formats to a portion of the first data to generate encoded data.

2. The method of claim 1, further comprising the step of transmitting the encoded data.

3. The method of claim 2, further comprising the steps of:
   receiving the encoded data;
   determining a sequence of decoding formats that properly decodes the encoded data, which sequence of decoding formats represents an encoding of the second data;
   applying each decoding format of the sequence of decoding formats, to a portion of the encoded data to recover the first data; and
   recovering the second data from the sequence of decoding formats.

4. A method of providing enhanced communication, comprising the steps of:
   at a transmitter:
     obtaining first and second data for transmission on a communication channel, the second data providing additional data to the first data;
     selecting a plurality of encoding formats to encode the first data;
     generating encoded data by applying the plurality of encoding formats to encode various portions of the first data in an arrangement that encodes the second data; and
     transmitting the encoded data on the communication channel.

5. The method of claim 4, wherein the first data represents a frame of data symbols.

6. The method of claim 4, wherein the step of generating encoded data comprises the step of convolutionally encoding the first data by transitioning through a multi-stage trellis of a convolutional encoder while mapping information symbols to channel symbols according to one of the plurality of encoding formats.

7. The method of claim 6, wherein the step of generating encoded data comprises the step of selecting one of the plurality of encoding formats at selected stages of the multi-stage trellis, according to content of the second data.

8. The method of claim 4, further comprising the steps of:

at a receiver:

receiving the encoded data on the communication channel;

determining a plurality of decoding formats and a particular arrangement thereof that properly decode the encoded data;

applying the plurality of decoding formats to the encoded data, according to the particular arrangement, to recover the first data; and recovering the second data from the particular arrangement of the plurality of decoding formats.

9. The method of claim 4, further comprising the steps of:

at a receiver:

receiving the encoded data on the communication channel;

decoding the encoded data to recover the first data, including the steps of:

applying a plurality of decoding formats to a portion of the encoded data;

selecting a particular decoding format that generates decoded data with a minimum likelihood of error according to a particular criteria;

applying the particular decoding format to the portion of the encoded data to obtain a portion of the first data; and recovering the second data based on identification of the particular decoding format applied to recover the first data.

10. The method of claim 9, wherein the step of decoding the encoded data includes the step of applying a Viterbi Algorithm decoder.

11. A method, comprising the steps of:

receiving encoded data from a communication channel;

determining a plurality of decoding formats and a particular arrangement thereof that properly decode the encoded data;

applying the plurality of decoding formats to the encoded data, according to the particular arrangement, to recover first data; and recovering second data from the particular arrangement of the plurality of decoding formats.

12. The method of claim 11, wherein the second data provides supplemental information to the first data.

13. An apparatus, comprising:

a receiver adaptable to receive encoded data from a communication channel;

a memory that stores a plurality of decoding formats; and a decoder coupled to the receiver and to the memory, the decoder being adaptable to select a particular arrangement of the plurality of decoding formats that decode the encoded data;

wherein the decoder is responsive to the encoded data to recover first data by applying the plurality of decoding formats to the encoded data, according to the particular arrangement, and to recover second data from the particular arrangement of the plurality of decoding formats.

14. The apparatus of claim 13, wherein the second data provides supplemental information to the first data.

15. An apparatus, comprising:

a memory that stores a plurality of encoding formats;

an encoder coupled to the memory, and adaptable to generate encoded data comprising first data encoded by application of the plurality of encoding formats, and second data encoded by a particular arrangement of the application of the plurality of encoding formats; and a transmitter coupled to the encoder and adaptable to transmit the encoded data.

16. The apparatus of claim 15, wherein the first data comprises a frame of data symbols, and the second data comprises a data symbol that supplements the frame of data symbols.

17. The apparatus of claim 15, wherein the first data comprises a plurality of data frames and one of the plurality of encoding formats is selected for each of the plurality of data frames according to content of the second data.

18. The apparatus of claim 15, wherein the encoder is a convolutional encoder.

* * * * *